(12) United States Patent
Xue et al.

(10) Patent No.: US 11,863,109 B2
(45) Date of Patent: Jan. 2, 2024

(54) METHOD AND DEVICE FOR ADJUSTING PERMANENT MAGNET MOTOR, EQUIPMENT, AND STORAGE MEDIUM

(71) Applicant: CRRC YONGJI ELECTRIC CO., LTD, Yuncheng (CN)

(72) Inventors: Xiuhui Xue, Yuncheng (CN); Xiaojun Hou, Yuncheng (CN); Tao Geng, Yuncheng (CN); Lei Zhang, Yuncheng (CN); Chen Jiang, Yuncheng (CN); Yukun Zhao, Yuncheng (CN); Lanlan Guo, Yuncheng (CN)

(73) Assignee: CRRC YONGJI ELECTRIC CO., LTD., Shanxi (CN)

( * ) Notice: Subject to any disclaimer, the term of this patent is extended or adjusted under 35 U.S.C. 154(b) by 0 days.

(21) Appl. No.: 17/784,211

(22) PCT Filed: Nov. 20, 2020

(86) PCT No.: PCT/CN2020/130540
§ 371 (c)(1),
(2) Date: Jun. 10, 2022

(87) PCT Pub. No.: WO2021/179673
PCT Pub. Date: Sep. 16, 2021

(65) Prior Publication Data
US 2023/0039034 A1 Feb. 9, 2023

(30) Foreign Application Priority Data
Mar. 13, 2020 (CN) .......................... 202010175890.5

(51) Int. Cl.
*H02P 6/182* (2016.01)
*H02P 29/028* (2016.01)

(52) U.S. Cl.
CPC ............ *H02P 6/182* (2013.01); *H02P 29/028* (2013.01); *H02P 2207/05* (2013.01)

(58) Field of Classification Search
CPC .. H02P 29/028; H02P 2207/05; H02P 29/032; H02P 15/03; H02P 11/25;
(Continued)

(56) References Cited

U.S. PATENT DOCUMENTS

| 10,756,659 B1 * | 8/2020 | Li .......................... H02P 21/22 |
| 2007/0216249 A1 | 9/2007 | Gruendel |
| 2011/0234180 A1 | 9/2011 | Cullen |

FOREIGN PATENT DOCUMENTS

| CA | 3137550 A1 * | 10/2020 | ............. H02K 1/278 |
| CN | 105515321 A | 4/2016 | |

(Continued)

OTHER PUBLICATIONS

International Search Report in the international application No. PCT/CN2020/130540, dated Feb. 18, 2021.
(Continued)

*Primary Examiner* — Bickey Dhakal
(74) *Attorney, Agent, or Firm* — Cooper Legal Group, LLC (57) ABSTRACT

The application provides a method and device for adjusting a permanent magnet motor, an equipment, and a storage medium. The method includes the following operations. An electronic equipment acquires a counter electromotive force (CEMF) parameter, information of an electromagnetic structure of a permanent magnet motor to be adjusted and a minimum impedance value of any short-circuited coil of the permanent magnet motor to be adjusted, to determine an operational time of the short-circuited coil. The electronic equipment further judges, according to the operational time of the short-circuited coil, whether an adjustment instruction
(Continued)

is required to be transmitted to a production equipment. When the operational time is inconsistent with a preset time, the electronic equipment transmits the adjustment instruction to the production equipment. The production equipment adjusts, according to the adjustment instruction, the electromagnetic structure of the permanent magnet motor to be adjusted. Through the method of the application, a rail transit vehicle may keep running for the preset time safely after an inter-turn short circuit failure occurs to the permanent magnet motor, and the operational safety of the rail transit vehicle is improved.

17 Claims, 6 Drawing Sheets (58) Field of Classification Search
CPC ...... H02P 11/27; H02P 2213/06; H02P 23/00; H02P 29/024; B60L 3/0023; B60L 3/08
See application file for complete search history.

(56) References Cited

FOREIGN PATENT DOCUMENTS

| | | | |
|---|---|---|---|
| CN | 106844923 | A | 6/2017 |
| CN | 108875255 | A | 11/2018 |
| CN | 109061475 | A | 12/2018 |
| CN | 109167545 | A | 1/2019 |
| CN | 110022099 | A | 7/2019 |
| CN | 110212710 | A | 9/2019 |
| CN | 108512469 | B | 11/2019 |
| CN | 110417199 | A | 11/2019 |
| CN | 112542910 | A | 3/2021 |
| EP | 3116109 | A1 | 1/2017 |
| JP | 2012050287 | A | 3/2012 |
| JP | 2012178914 | A | 9/2012 |
| JP | 2016123222 | A | 7/2016 |
| JP | 2019180112 | A | 10/2019 |
| WO | 2009001468 | A1 | 12/2008 |
| WO | 2018099266 | A1 | 6/2018 |

OTHER PUBLICATIONS

Supplementary European Search Report in the European application No. 20924123.1, dated Dec. 14, 2022, 8 pgs.
English translation of the Written Opinion of the International Search Authority in the international application No. PCT/CN2020/130540, dated Feb. 18, 2021, 4 pgs.
First Office Action of the Japanese application No. 2022-551427, dated May 16, 2023. 4 pages with English translation.
"Impact of Slot/Pole Combination on Inter-Turn Short-Circuit Current in Fault-Tolerant Permanent Magnet Machines", Apr. 2016, Jiri Dusek, Puvan Arumugam, Christoper Brunson, Emmanuel K. Amankwah, Tahar Hamiti and Chris Gerada, IEEE Transactions on Magnetics, vol. 52, No. 4, 9 pages.
"A Review on Turn-Turn Short Circuit Fault Management", Mar. 2015, Puvan Arumurgam, Chris Gerada, Tahar Hamiti, Christopher Hill and Serhiy Bozhko, 2015 International Conference on Electrical Systems for Aircraft, Railway, ship Propulsion and Road Vehicles (ESARS), IEEE, 5 pages.
"Mitigation of Turn-to-Turn Faults in Fault Tolerant Permanent Magnet Synchronous Motors", Jun. 2015, Jorge G. Cintron-Rivera and Elias Strangas, IEEE Transactions on Energy Conversion, IEEE Service Center, Piscataway, NJ, US, vol. 30, No. 2, pp. 465-475.
"Research on the Influence of Inter-turn Short Circuit Fault on the Temperature Field of Permanent Magnet Synchronous Motor", Jan. 2017, Hongbo Qiu, Wenfei Yu, Bingxia Tang, Cunxiang Yand and Haiyang Zhao, Journal of Electrical Engineering & Technology, pp. 1566-1574.
"System Analysis of Permanent Magnet Traction Drives", Dec. 2012, Juliette Soulard, Retrieved from the Internet: URL: https://www.diva-portal.org/smash/record.jsf?pid=diva2%3A606229&dswid=4364, 20 pages.
First Office Action of the European application No. 20924123.1, dated Sep. 22, 2023. 9 pages.

* cited by examiner

METHOD AND DEVICE FOR ADJUSTING PERMANENT MAGNET MOTOR, EQUIPMENT, AND STORAGE MEDIUM

TECHNICAL FIELD

The disclosure relates to a rail transit technology, and particularly to a method and device for adjusting a permanent magnet motor, an equipment, and a storage medium.

BACKGROUND

A rail transit vehicle has become an important means of transportation in the modern society. A motor may be arranged in the rail transit vehicle, and the motor is an important device for ensuring the normal operation of the rail transit vehicle. The motor refers to an electromagnetic device converting or transmitting electric energy according to the law of electromagnetic induction.

In the related art, a rotating magnetic field is formed in a stator winding after a three-phase current is input to the stator winding. Since a permanent magnet with fixed magnetic poles is mounted on a rotor, the rotating magnetic field generated in a stator may drive the rotor to rotate according to the principle that like poles repel and unlike poles attract. A magnetic field of a permanent magnet rotor performs a cutting motion on a coil wire to generate a counter electromotive force (CEMF) in the coil wire, when the rotor rotates. When an inter-turn short circuit occurs to a coil of the motor of the rail transit vehicle, the continuous operation of the vehicle may cause conditions where the coil is fused, a fused matter enters an air gap between the stator and the rotor, and a bearing clearance occurs, etc., to further result in failures such as the separation of the motor, the derailment of the vehicle, etc.

Therefore, how to ensure safety of the motor of the rail transit vehicle is a problem that needs to be solved.

SUMMARY

The disclosure provides a method and device for adjusting a permanent magnet motor, an equipment, and a storage medium, to solve the problem of how to ensure the operational safety of a motor of a rail transit vehicle in case of an inter-turn short circuit of a coil of the motor.

According to a first aspect, the disclosure provides a method for adjusting a permanent magnet motor, which may include the following operations.

A CEMF parameter, information of an electromagnetic structure of a permanent magnet motor to be adjusted and a minimum impedance value of any short-circuited coil of the permanent magnet motor to be adjusted are acquired, here the CEMF parameter is a CEMF value of the permanent magnet motor at a maximum rotational speed.

An operational time of a smallest short-circuited coil is determined according to the CEMF parameter, the information of the electromagnetic structure and the minimum impedance value.

An adjustment instruction configured to instruct an production equipment to adjust the electromagnetic structure of the permanent magnet motor to be adjusted is transmitted to the production equipment when the operational time is inconsistent with a preset time, so that the production equipment adjusts the electromagnetic structure of the permanent magnet motor to be adjusted.

In an embodiment, the operation that the CEMF parameter is acquired may include the following operations.

An acquisition instruction is transmitted to a test permanent magnet motor, and the CEMF parameter returned by the test permanent magnet motor according to the acquisition instruction is received.

Or, the CEMF value of the permanent magnet motor at the maximum rotational speed is determined through a simulation technology.

In an embodiment, the operation that the operational time of the short-circuited coil is determined according to the CEMF parameter, the information of the electromagnetic structure and the minimum impedance value may include the following operations.

A generated heat value of the short-circuited coil is determined according to the CEMF parameter and the minimum impedance value.

The operational time of the short-circuited coil is determined according to the generated heat value of the short-circuited coil and the information of the electromagnetic structure.

In an embodiment, the method may further include the following operations. A coil parameter of a coil of the permanent magnet motor to be adjusted is acquired.

The operation that the generated heat value of the short-circuited coil is determined according to the CEMF parameter and the minimum impedance value may include the following operations.

A current value of the short-circuited coil is determined according to the CEMF parameter and the minimum impedance value.

A current density of the short-circuited coil is determined according to the coil parameter and the current value.

The generated heat value of the short-circuited coil is determined according to the current density and the minimum impedance value.

In an embodiment, the information of the electromagnetic structure of the permanent magnet motor to be adjusted may include one or more of: information of a cooling structure of the motor, a melting point of an insulating material, a permanent magnet parameter, a slot shape parameter of the motor, or an electromagnetic wire parameter.

In an embodiment, the adjustment instruction may specifically be configured to instruct the production equipment to perform one or more of: adjusting the permanent magnet parameter, replacing the insulating material, adjusting a cooling structure of the permanent magnet motor, adjusting the slot shape parameter of the motor, or adjusting the electromagnetic wire parameter, on the permanent magnet motor to be adjusted.

In an embodiment, the method may further include the following operations.

A target rotational speed of the permanent magnet motor to be adjusted is determined according to the information of the electromagnetic structure, the minimum impedance value, and a target operational time of the permanent magnet motor.

A parameter to be adjusted is determined according to the target rotational speed.

An operational speed of the permanent magnet motor to be adjusted is adjusted according to the parameter to be adjusted.

According to a second aspect, the disclosure provides a device for adjusting a permanent magnet motor, which may include a first acquisition unit, a first processing unit, a judgment unit, and a first adjustment unit.

The first acquisition unit may be configured to acquire a CEMF parameter, information of an electromagnetic structure of a permanent magnet motor to be adjusted and a minimum impedance value of any short-circuited coil of the permanent magnet motor to be adjusted, here the CEMF parameter is a CEMF value of the permanent magnet motor at a maximum rotational speed.

The first processing unit may be configured to determine, according to the CEMF parameter, the information of the electromagnetic structure and the minimum impedance value, an operational time of the short-circuited coil.

The judgment unit may be configured to judge whether the operational time is consistent with a preset time.

The first adjustment unit may be configured to transmit, to a production equipment, an adjustment instruction configured to instruct the production equipment to adjust the electromagnetic structure of the permanent magnet motor to be adjusted, when the operational time is inconsistent with the preset time, so that the production equipment adjusts the electromagnetic structure of the permanent magnet motor to be adjusted.

In an embodiment, the first acquisition unit, when configured to acquire the CEMF parameter, may specifically be configured to:

transmit an acquisition instruction to a permanent magnet motor, and receive the CEMF parameter returned by the permanent magnet motor according to the acquisition instruction; or, determine, through a simulation technology, the CEMF value of the permanent magnet motor at the maximum rotational speed.

In an embodiment, the first processing unit may include a first determination module and a second determination module.

The first determination module may be configured to determine, according to the CEMF parameter and the minimum impedance value, a generated heat value of the short-circuited coil.

The second determination module may be configured to determine, according to the generated heat value of the short-circuited coil and the information of the electromagnetic structure, the operational time of the short-circuited coil.

In an embodiment, the device may further include a second acquisition unit.

The second acquisition unit may be configured to acquire a coil parameter of a coil of the permanent magnet motor to be adjusted.

The first determination module may include a first determination submodule, a second determination submodule, and a third determination submodule.

The first determination submodule may be configured to determine, according to the CEMF parameter and the minimum impedance value, a current value of the short-circuited coil.

The second determination submodule may be configured to determine, according to the coil parameter and the current value, a current density of the short-circuited coil.

The third determination submodule may be configured to determine, according to the current density and the minimum impedance value, the generated heat value of the short-circuited coil.

In an embodiment, the structure information of the permanent magnet motor to be adjusted may include one or more of: information of a cooling structure of the permanent magnet motor, a melting point of an insulating material, a permanent magnet parameter, a slot shape parameter of the motor, or an electromagnetic wire parameter.

In an embodiment, the adjustment instruction may specifically be configured to instruct the production equipment to perform one or more of: adjusting the permanent magnet parameter, replacing the insulating material, adjusting a cooling structure of the permanent magnet motor, adjusting the slot shape parameter of the motor, or adjusting the electromagnetic wire parameter, on the permanent magnet motor to be adjusted.

In an embodiment, the device may further include a second processing unit, a determination unit, and a second adjustment unit.

The second processing unit may be configured to determine, according to the information of the electromagnetic structure, the minimum impedance value, and a target operational time of the permanent magnet motor, a target rotational speed of the permanent magnet motor to be adjusted.

The determination unit may be configured to determine, according to the target rotational speed, a parameter to be adjusted.

The second adjustment unit may be configured to adjust, according to the parameter to be adjusted, the operation of the permanent magnet motor to be adjusted.

According to a third aspect, the disclosure provides an electronic equipment, which may include a memory, a processor, and a communication interface.

The memory may be configured to store an executable instruction for the processor.

The communication interface may be configured to acquire or transmit information according to an instruction of the processor.

The processor may be configured to call the program instruction in the memory to execute the method for adjusting a permanent magnet motor according to the first aspect and any one of possible designs of the first aspect.

According to a fourth aspect, the disclosure provides a readable storage medium having stored therein an executable instruction which, when executed by at least one processor of an electronic equipment, enables the electronic equipment to execute the method for adjusting a permanent magnet motor according to the first aspect and any one of possible designs of the first aspect.

According to the method and device for adjusting a permanent magnet motor, the equipment, and the storage medium provided in the disclosure, the electronic equipment acquires the CEMF parameter, the information of the electromagnetic structure of the permanent magnet motor to be adjusted and the minimum impedance value of any short-circuited coil of the permanent magnet motor to be adjusted, to determine the operational time of the short-circuited coil. When the operational time is inconsistent with the preset time, the electronic equipment transmits the adjustment instruction to the production equipment. The production equipment adjusts, according to the adjustment instruction, the electromagnetic structure of the permanent magnet motor to be adjusted. It is further ensured that the permanent magnet motor may keep operating for the preset time safely after a failure occurs, and the effect of improving the safety of the permanent magnet motor is achieved. In addition, for a rail transit vehicle in operation, when an inter-turn short circuit occurs to the permanent magnet motor of the rail transit vehicle, the electronic equipment determines, according to the information of the electromagnetic structure, the minimum impedance value, and the preset operational time, the target rotational speed of the permanent magnet motor to be adjusted, to make an adjusted rotational speed of the permanent magnet motor of the rail transit vehicle less than or equal to the target rotational speed. It is ensured that the rail transit vehicle may keep running to a target position safely after the inter-turn short circuit failure occurs to the permanent magnet motor, the vehicle and operational safety is ensured, and the effect of improving the safety of the permanent magnet motor is achieved.

BRIEF DESCRIPTION OF THE DRAWINGS

In order to describe the technical solutions in the disclosure or the related art more clearly, the drawings required to be used in descriptions of the embodiments or the related art will be simply introduced below. It is apparent that the drawings described below are some embodiments of the disclosure. Other drawings may further be obtained by those of ordinary skill in the art according to these drawings without paying any creative work.

DETAILED DESCRIPTION

In order to make the purpose, technical solutions, and advantages of the disclosure clearer, the technical solutions in the disclosure will be clearly and completely described below in combination with the drawings in the disclosure. It is apparent that the described embodiments are not all but part of embodiments of the disclosure. All other embodiments obtained by those of ordinary skill in the art based on the embodiments in the disclosure without paying any creative work shall fall within the scope of protection of the disclosure.

It is to be noted that similar reference numerals and letters represent similar terms in the drawings and thus a term, once being defined in a drawing, is not required to be further defined and explained in subsequent drawings. In addition, terms "first", "second" and the like in the descriptions of the disclosure are only adopted for distinguishing descriptions and may not be understood to indicate or imply relative importance.

Rail transit has become an important means of transportation in the modern society. With the diversified development of a technology, more and more types of rail transits have been present, e.g., bullet train, locomotive, metro, light rail, monorail, etc. An existing rail transit vehicle is usually a train set consisting of multiple carriages. The train set is usually formed in a trailer-tractor combination manner and in fixed marshalling, and thus has a more stable power. The trailer-tractor combination manner refers to a manner of marshalling tractor carriages and trailer carriages according to a certain sequence. A motor is mounted in the tractor carriage to provide power for the train set. The motor may be a permanent magnet motor, a permanent magnet assisted reluctance motor, etc.

The motor refers to an electromagnetic device converting or transmitting electric energy according to the law of electromagnetic induction, and includes components such as a stator, a rotor, a housing, etc. At present, the motor in the rail transit vehicle mostly adopts an alternating current (AC) motor. An AC asynchronous motor is applied extensively due to its advantages of simple structure, low production cost, simplicity for maintenance, quick dynamic response, etc. A permanent magnet motor has gradually been applied to the rail transit vehicle due to its advantages of high energy efficiency, as well as high performance, high-precision transmission, and quick dynamic response. When the permanent magnet motor operates, a three-phase current is input to a stator winding, and a rotating magnetic field is formed in the stator winding after the current is input. Since a permanent magnet with fixed magnetic poles is mounted on a rotor, the rotating magnetic field generated in a stator may drive the rotor to rotate according to the principle that like poles repel and unlike poles attract. When the rotor rotates, a magnetic field of a permanent magnet rotor performs a cutting motion on a coil wire to further generate a counter electromotive force (CEMF) in the coil wire.

When an inter-turn short circuit occurs to a coil of the motor, the rail transit vehicle may keep running under the driving of other motors even though the motor is shut down. After the motor is shut down, a short-circuited coil in the stator may form a closed loop during the operation of the motor, and a permanent magnet on the rotor keeps operating with the vehicle to further generate a rotating magnetic field, i.e., a CEMF. The closed loop formed by the short-circuited coil generates an induced current in the magnetic field under the CEMF. Since a wire of the short-circuited coil has a resistance, electric energy in the short-circuited coil may be converted into heat energy under the CEMF. As the operational time of the vehicle extends, the heat energy on the short-circuited coil is continuously accumulated, and the temperature thereof keeps rising. In such case, when the vehicle does not timely stop or reduce its running speed, the conditions where the coil is fused, a fused matter enters an air gap between the stator and the rotor, and a bearing clearance, etc., are likely to occur to the motor, to further result in the collision of the stator and the rotor and a bearing failure, which may eventually cause secondary failures such as the separation of the motor, etc.

In order to solve the foregoing problems, the disclosure provides a method and device for adjusting a permanent magnet motor, an equipment, and a storage medium. An electronic equipment may determine an operational time of any short-circuited coil of a permanent magnet motor to be adjusted in a production stage of the permanent magnet motor to be adjusted, according to an electromotive force (EMF) parameter and information of an electromagnetic structure of the permanent magnet motor to be adjusted and a minimum impedance value of the short-circuited coil. In the operational time, the permanent magnet motor to be adjusted operates at a maximum rotational speed, and the short-circuited coil may not be fused. When the operational time is shorter than a preset time, it is considered that the permanent magnet motor to be adjusted has a potential safety hazard, and an electromagnetic structure of the permanent magnet motor to be adjusted is required to be adjusted. In addition, the electronic equipment may also determine a target rotational speed of the permanent magnet motor to be adjusted when the rail transit vehicle runs, according to the information of the electromagnetic structure of the permanent magnet motor to be adjusted, the minimum impedance value of any short-circuited coil, and a target operational time. The running speed of the rail transit vehicle is further adjusted according to the target rotational speed to ensure that the rotational speed of the permanent magnet motor to be adjusted is lower than the target rotational speed when the rail transit vehicle runs. The effect of ensuring safe running of the rail transit vehicle is further achieved.

An execution body of the disclosure is an electronic equipment, which may be a computer, a server, an on-board computer, a controller, or the like. No limitations are made thereto in the disclosure.

Figure 1:
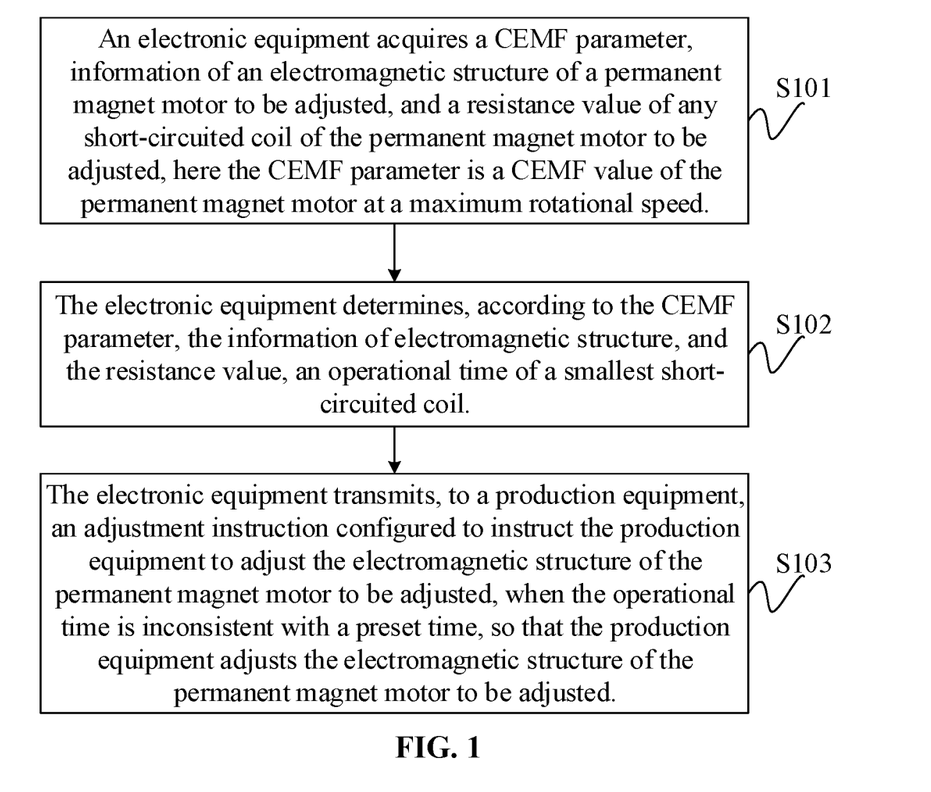
FIG. 1 is a flowchart of a method for adjusting a permanent magnet motor according to an embodiment of the disclosure.

FIG. 1 is a flowchart of a method for adjusting a permanent magnet motor according to an embodiment of the disclosure. As shown in FIG. 1, the method of the embodiment may include the following operations.

In operation S101, an electronic equipment acquires a CEMF parameter, information of an electromagnetic structure of a permanent magnet motor to be adjusted and a minimum impedance value of any short-circuited coil of the permanent magnet motor to be adjusted, here the CEMF parameter is a CEMF value of the permanent magnet motor at a maximum rotational speed.

In the embodiment, the electronic equipment may acquire information such as the CEMF value of the permanent magnet motor to be adjusted at the maximum rotational speed, the minimum impedance value of any short-circuited coil, and the information of the electromagnetic structure, etc. in a manner of requesting from other equipments, reading from a memory, obtaining through an input, or the like. No limitations are made thereto in the disclosure.

The electronic equipment further acquires an operational time of the short-circuited coil when an inter-turn short circuit occurs to the permanent magnet motor to be adjusted at the maximum rotational speed, according to the information.

The CEMF parameter is a CEMF value generated by the coil by cutting a magnetic induction line of a magnetic pole during the operation of the permanent magnet motor to be adjusted.

In an example, the electronic equipment may transmit an acquisition instruction to a test permanent magnet motor, and receive the CEMF parameter returned by the test permanent magnet motor according to the acquisition instruction. Or, the CEMF value of the permanent magnet motor at the maximum rotational speed is determined through a simulation technology.

The test permanent magnet motor is a permanent magnet motor with the same information of an electromagnetic structure as the permanent magnet motor to be adjusted.

The electronic equipment may acquire the CEMF parameter from the test permanent magnet motor as follows. The electronic equipment transmits an acquisition instruction to a voltage measurement device on the test permanent magnet motor, and acquires the CEMF value, measured by the voltage measurement device, of the test permanent magnet motor at the maximum rotational speed.

The electronic equipment may also simulate, through the simulation technology and according to the information of the electromagnetic structure of the permanent magnet motor to be adjusted, the permanent magnet motor to be adjusted and an operational condition of the permanent magnet motor to be adjusted at the maximum rotational speed in an environment such as a simulation software, etc., to further determine the CEMF value of the permanent magnet motor to be adjusted at the maximum rotational speed.

The permanent magnet motor to be adjusted may have at least one coil which may be arranged on the stator. The coil of the permanent magnet motor generates a magnetic field when a current flows through the coil, and the rotor rotates under the interaction of a magnetic field of a magnetic pole and the magnetic field of the coil to implement the electric energy conversion or transmission of the permanent magnet motor. There is an insulating material or insulating coating on a surface of a wire in the coil. During usage, the insulating material may be fractured, abraded, separated, etc., to further cause two turns of the wire in the coil contacting each other, resulting in a phenomenon of inter-turn short circuit of the coil. The minimum impedance value of any short-circuited coil is an impedance value of any turn of the wire in the coil. The coil in the permanent magnet motor may also be arranged on the rotor. In such case, a permanent magnet is arranged on the stator.

In an example, the information of the electromagnetic structure of the permanent magnet motor to be adjusted includes one or more of: information of a cooling structure of the permanent magnet motor, a melting point of an insulating material, a permanent magnet parameter, a slot shape parameter of the motor, an electromagnetic wire parameter, etc.

The cooling structure of the permanent magnet motor is configured to cool the permanent magnet motor. The information of the cooling structure of the permanent magnet motor may include cooling efficiency, a cooling manner, etc. The insulating material is used for insulation protection over the wire on the coil of the permanent magnet motor. A permanent magnet is used for the rotor of the permanent magnet motor. The permanent magnet parameter includes the magnetic performance, size, etc., of the permanent magnet.

In operation S102, the electronic equipment determines, according to the CEMF parameter, the information of the electromagnetic structure and the minimum impedance value, an operational time of a smallest short-circuited coil.

In the embodiment, after acquiring the CEMF parameter, the information of the electromagnetic structure and the minimum impedance value of the permanent magnet motor to be adjusted according to the operation S101, the electronic equipment imports the information to a parameter model, and obtains the operational time of the short-circuited coil through the parameter model. The parameter model may be a mapping relationship model, or an algorithm model.

In operation S103, the electronic equipment transmits, to a production equipment, an adjustment instruction configured to instruct the production equipment to adjust the electromagnetic structure of the permanent magnet motor to be adjusted, when the operational time is inconsistent with a preset time, so that the production equipment adjusts the electromagnetic structure of the permanent magnet motor to be adjusted.

In the embodiment, the electronic equipment acquires the operational time of the short-circuited coil of the permanent magnet motor to be adjusted from the operation S102. The electronic equipment compares the operational time and the preset time.

When the operational time is more than or equal to the preset time, it is considered that the electromagnetic structure of the permanent magnet motor to be adjusted satisfies a condition and is not required to be adjusted. For example, the preset time is one hour, and the operational time of the short-circuited coil is three hours, then it is considered that the electromagnetic structure of the permanent magnet motor to be adjusted satisfies the condition and is not required to be adjusted.

When the operational time is shorter than the preset time, it is considered that the electromagnetic structure of the permanent magnet motor to be adjusted does not satisfy the condition and is required to be adjusted. For example, the preset time is one hour, and the operational time of the short-circuited coil is half an hour, then it is considered that the electromagnetic structure of the permanent magnet motor to be adjusted does not satisfy the condition and is required to be adjusted.

The electronic equipment transmits the adjustment instruction to the production equipment when determining that the electromagnetic structure of the permanent magnet motor to be adjusted is required to be adjusted. The production equipment adjusts the electromagnetic structure of the permanent magnet motor to be adjusted according to the adjustment instruction, after receiving the adjustment instruction transmitted by the electronic equipment.

Preferably, the adjustment instruction is specifically configured to instruct the production equipment to perform one or more of: adjusting the permanent magnet parameter, replacing the insulating material, adjusting a cooling structure of the motor, adjusting the slot shape parameter, adjusting the electromagnetic wire parameter, etc., on the permanent magnet motor to be adjusted.

The permanent magnet parameter and the electromagnetic structure determine an intensity of the magnetic field of the magnetic pole. When the same coil is used, the intensity of the magnetic field is higher at the same rotational speed, then the CEMF value generated by the coil by cutting the magnetic induction line is greater. When the rotational speed is kept unchanged, reduction of the CEMF value in the permanent magnet motor where the inter-turn short circuit occurs may effectively prolong the operational time of the short-circuited coil of the permanent magnet motor. Therefore, reduction of the permanent magnet parameter in the permanent magnet motor may effectively prolong the operational time of the short-circuited coil of the permanent magnet motor, optimize the permanent magnet motor, and improve the safety of the permanent magnet motor. The reduction of the permanent magnet parameter may affect the electromagnetic performance of the permanent magnet motor. A reluctance torque, e.g., a permanent magnet assisted reluctance motor, may further be increased on the basis of reducing the permanent magnet parameter, to ensure the electromagnetic performance The insulating material is used for the wire of the coil. After the inter-turn short circuit occurs to the permanent magnet motor, the short-circuited coil converts electric energy into heat energy under the CEMF and the resistance of the short-circuited coil, which causes the temperature of the coil rising continuously. The insulating material may be molten due to the over-temperature of the coil to further aggravate the short circuit failure of the coil. Therefore, replacing the insulating material of the permanent magnet motor to improve the heat resistance class and heat dissipation performance of the insulating material may ensure that the short-circuited coil of the permanent magnet motor operates for a longer time, optimize the permanent magnet motor, and improve the safety of the permanent magnet motor.

The cooling structure of the permanent magnet motor is configured to cool the permanent magnet motor. After the inter-turn short circuit occurs to the permanent magnet motor, the short-circuited coil converts electric energy into heat energy under the CEMF and the resistance of the short-circuited coil, which causes the temperature of the coil rising continuously. The cooling structure of the permanent magnet motor may be configured to dissipate heat by ventilation, heat conduction, and other manners to control the temperature of the permanent magnet motor and avoid an over-temperature. Therefore, adjusting the cooling structure of the permanent magnet motor to enhance the heat dissipation effect of the cooling structure of the permanent magnet motor may ensure that the short-circuited coil of the permanent magnet motor operates for a longer time, optimize the permanent magnet motor, and improve the safety of the permanent magnet motor.

In addition, adjusting the electromagnetic structure of the permanent magnet motor may further include adjusting the slot shape parameter, adjusting the electromagnetic wire parameter, adjusting the turns of the coil, changing a wire material, etc.

According to the method for adjusting a permanent magnet motor provided in the disclosure, the electronic equipment acquires the CEMF parameter, the information of the electromagnetic structure of the permanent magnet motor to be adjusted and the minimum impedance value of any short-circuited coil of the permanent magnet motor to be adjusted, to determine the operational time of the short-circuited coil. The electronic equipment further judges, according to the operational time of the short-circuited coil, whether the adjustment instruction is required to be transmitted to the production equipment. When the operational time is inconsistent with the preset time, the electronic equipment transmits the adjustment instruction to the production equipment. The production equipment adjusts, according to the adjustment instruction, the electromagnetic structure of the permanent magnet motor to be adjusted. In the disclosure, the operational time of the short-circuited coil is acquired to judge whether the permanent magnet motor to be adjusted may operate for the preset time safely, and the adjustment instruction is transmitted, according to a judgment result, to the production equipment of the permanent magnet motor to be adjusted, to implement optimization and adjustment of the permanent magnet motor. As such, the short-circuited coil of the permanent magnet motor may operate for a longer time, the permanent magnet motor is optimized, and the safety of the permanent magnet motor is improved.

A specific implementation of determining, according to the CEMF parameter, the information of the electromagnetic structure and the minimum impedance value, the operational time of the short-circuited coil in the operation S102 in FIG. 1 will be described in detail based on the embodiment shown in FIG. 1.

Figure 2:
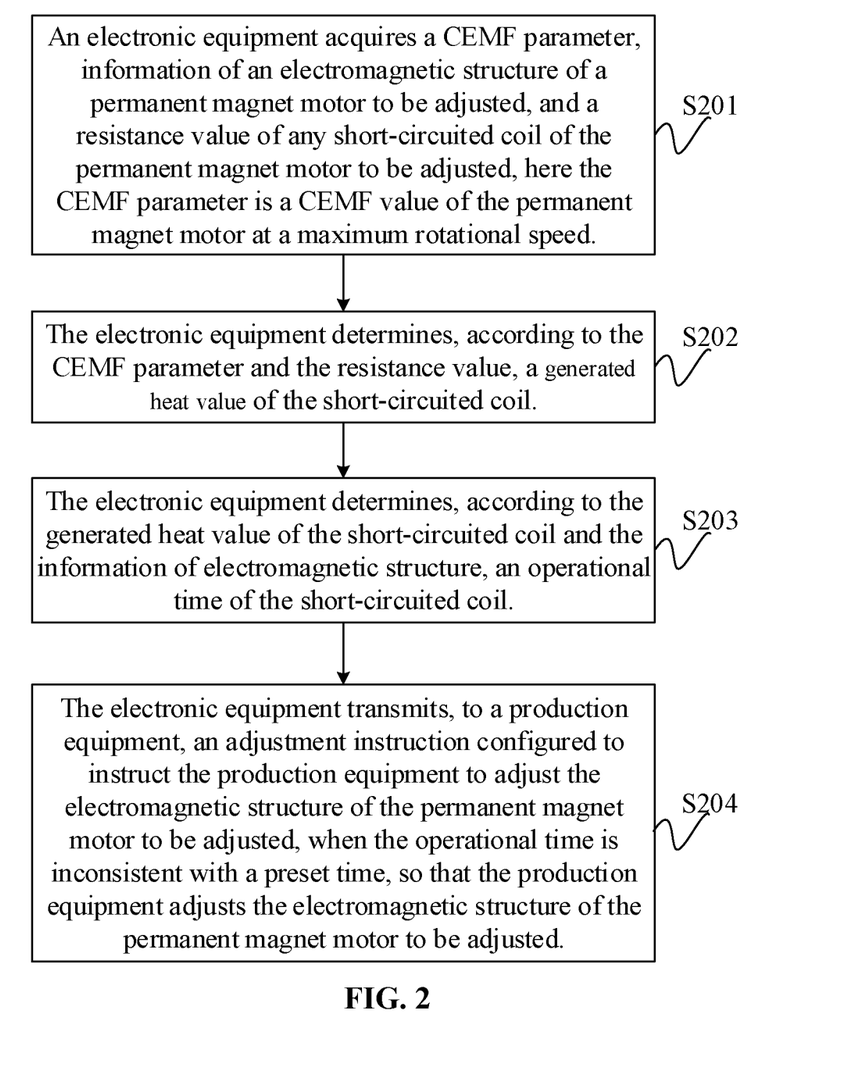
FIG. 2 is a flowchart of another method for adjusting a permanent magnet motor according to an embodiment of the disclosure.

FIG. 2 is a flowchart of another method for adjusting a permanent magnet motor according to an embodiment of the disclosure. As shown in FIG. 2, the method of the embodiment may include the following operations.

In operation S201, an electronic equipment acquires a CEMF parameter, information of an electromagnetic structure of a permanent magnet motor to be adjusted and a minimum impedance value of any short-circuited coil of the permanent magnet motor to be adjusted, here the CEMF parameter is a CEMF value of the permanent magnet motor at a maximum rotational speed.

An implementation of the operation S201 is similar to that of the operation S101 in the embodiment shown in FIG. 1, and will not be elaborated in the embodiment.

In operation S202, the electronic equipment determines, according to the CEMF parameter and the minimum impedance value, a generated heat value of the short-circuited coil.

In the embodiment, the electronic equipment acquires the CEMF parameter and the minimum impedance value from the operation S201. In the short-circuited coil of the permanent magnet motor, a CEMF acts on the short-circuited coil to convert electric energy into heat energy. A generated heat value of the short-circuited coil in a unit time is calculated through the following formula:

$$Q=V^2_e/R \qquad (1).$$

Here Q is the generated heat value in Joule. V is the CEMF value in volt. R is a resistance value in ohm. t is the unit time, i.e., one hour.

In operation S203, the electronic equipment determines, according to the generated heat value of the short-circuited coil and the information of the electromagnetic structure, an operational time of the short-circuited coil.

The information of the electromagnetic structure of the permanent magnet motor includes information of cooling electromagnetic structure of the permanent magnet motor, a melting point of an insulating material, a permanent magnet parameter, a slot shape parameter of the motor, an electromagnetic wire parameter, etc.

The electronic equipment may acquire the generated heat value of the short-circuited coil in the unit time according to the operation S202, and acquire a heat dissipation value generated by a cooling electromagnetic structure of the permanent magnet motor in the unit time according to the information of cooling electromagnetic structure of the permanent magnet motor. The electronic equipment may calculate a practical generated heat value of the permanent magnet motor according to the generated heat value and the heat dissipation value. The practical generated heat value is a generated heat value that may still be accumulated after the interaction of heating and heat dissipation. With the accumulation of this part of generated heat value, the temperature of the permanent magnet motor may rise continuously.

A high enough temperature of the permanent magnet motor may cause the insulating material melting and the coil fusing, to further bring the safety problem of the permanent magnet motor. Therefore, an operational time of the permanent magnet motor before reaching the high enough temperature is the operational time of the short-circuited coil of the permanent magnet motor.

The temperature value may be an empirical value, and it is determined empirically that the permanent magnet motor is easily damaged after reaching the temperature. The temperature value may also be a calculated value, and it is calculated according to melting points of the insulating material, a wire material, etc. The temperature value may also be a trial value, and it is determined according to tests that the permanent magnet motor is easily damaged after reaching the temperature.

In operation S204, the electronic equipment transmits, to a production equipment, an adjustment instruction configured to instruct the production equipment to adjust the electromagnetic structure of the permanent magnet motor to be adjusted, when the operational time is inconsistent with a preset time, so that the production equipment adjusts the electromagnetic structure of the permanent magnet motor to be adjusted.

An implementation of the operation S204 is similar to that of the operation S103 in the embodiment shown in FIG. 1, and will not be elaborated in the embodiment.

According to the method for adjusting a permanent magnet motor provided in the disclosure, the electronic equipment acquires the CEMF parameter and the minimum impedance value of any short-circuited coil of the permanent magnet motor to be adjusted, to determine the generated heat value of the short-circuited coil. The electronic equipment determines, according to the generated heat value of the short-circuited coil and the information of the electromagnetic structure of the permanent magnet motor to be adjusted, the operational time during which no safety problem may be brought to the short-circuited coil. The electronic equipment further judges, according to the operational time of the short-circuited coil, whether the adjustment instruction is required to be transmitted to the production equipment. When the operational time is inconsistent with the preset time, the electronic equipment transmits the adjustment instruction to the production equipment. The production equipment adjusts, according to the adjustment instruction, the electromagnetic structure of the permanent magnet motor to be adjusted. In the disclosure, the electronic equipment calculates the generated heat value of the short-circuited coil according to the CEMF parameter and the minimum impedance value. The electronic equipment determines, according to the generated heat value and the electromagnetic structure parameter of the permanent magnet motor, the operational time of the short-circuited coil. The electronic equipment optimizes and adjusts, according to the operational time, the permanent magnet motor to be adjusted. As such, the short-circuited coil of the permanent magnet motor may operate for a longer time, the permanent magnet motor is optimized, and the safety of the permanent magnet motor is improved.

A specific implementation of determining, according to the CEMF parameter and the minimum impedance value, the generated heat value of the short-circuited coil in the operation S202 in FIG. 2 will be described in detail based on the embodiments shown in FIGS. 1 and 2.

Figure 3:
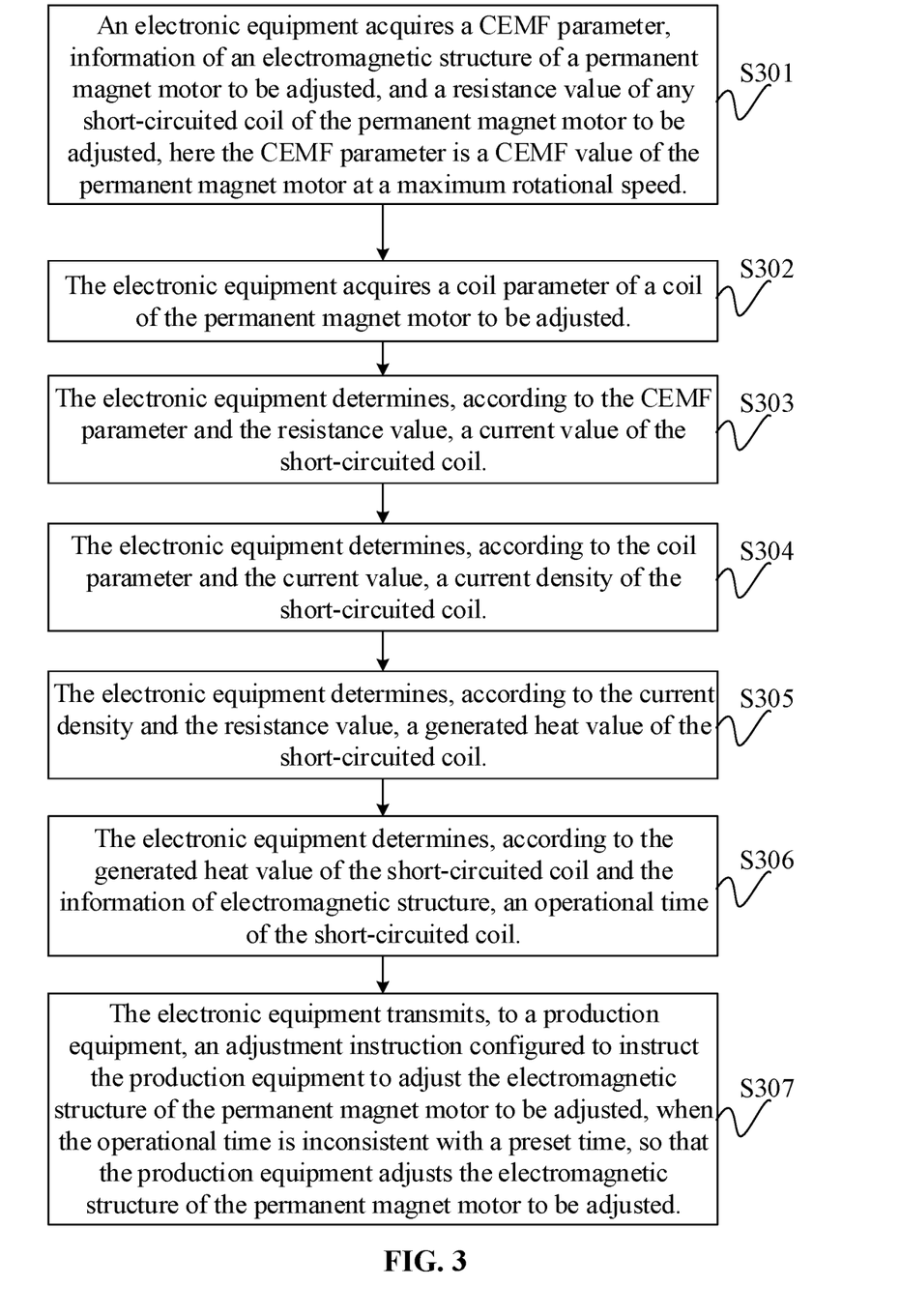
FIG. 3 is a flowchart of another method for adjusting a permanent magnet motor according to an embodiment of the disclosure.

FIG. 3 is a flowchart of another method for adjusting a permanent magnet motor according to an embodiment of the disclosure. As shown in FIG. 3, the method of the embodiment may include the following operations.

In operation S301, an electronic equipment acquires a CEMF parameter, information of an electromagnetic structure of a permanent magnet motor to be adjusted and a minimum impedance value of any short-circuited coil of the permanent magnet motor to be adjusted, here the CEMF parameter is a CEMF value of the permanent magnet motor at a maximum rotational speed.

An implementation of the operation S301 is similar to that of the operation S101 in the embodiment shown in FIG. 1, and will not be elaborated in the embodiment.

In operation S302, the electronic equipment acquires a coil parameter of a coil of the permanent magnet motor to be adjusted.

The electronic equipment may acquire the coil parameter of the coil corresponding to the permanent magnet motor to be adjusted, by reading from a memory. The electronic equipment may also acquire the coil parameter of the coil corresponding to the permanent magnet motor to be adjusted, according to input information. No limitations are made thereto in the disclosure.

The coil parameter of the coil of the permanent magnet motor includes a cross-sectional area of a wire, resistivity of the wire, a length of the wire, turns of the coil, etc.

In operation S303, the electronic equipment determines, according to the CEMF parameter and the minimum impedance value, a current value of the short-circuited coil.

In the embodiment, the short-circuited coil generates the current value under the CEMF. The current value is a quotient of the CEMF value over the minimum impedance value.

In operation S304, the electronic equipment determines, according to the coil parameter and the current value, a current density of the short-circuited coil.

In the embodiment, the current density of the short-circuited coil is a value of a current flowing through a unit area. The current density is a ratio of the current of the short-circuited coil to the cross-sectional area of the wire.

In operation S305, the electronic equipment determines, according to the current density and the minimum impedance value, a generated heat value of the short-circuited coil.

In the embodiment, a generated heat value of the short-circuited coil in a unit time may be calculated according to the current and the minimum impedance value through the following formula:

$$Q = I^2 R t \qquad (1).$$

Here Q is the generated heat value in Joule. I is the current value in Ampere. R is a resistance value in ohm. t is the unit time, i.e., one hour.

In operation S306, the electronic equipment determines, according to the generated heat value of the short-circuited coil and the information of the electromagnetic structure, an operational time of the short-circuited coil.

An implementation of the operation S306 is similar to that of the operation S203 in the embodiment shown in FIG. 2, and will not be elaborated in the embodiment.

In operation S307, the electronic equipment transmits, to a production equipment, an adjustment instruction configured to instruct the production equipment to adjust the electromagnetic structure of the permanent magnet motor to be adjusted, when the operational time is inconsistent with a preset time, so that the production equipment adjusts the electromagnetic structure of the permanent magnet motor to be adjusted.

An implementation of the operation S307 is similar to that of the operation S103 in the embodiment shown in FIG. 1, and will not be elaborated in the embodiment.

According to the method for adjusting a permanent magnet motor provided in the disclosure, the electronic equipment acquires the CEMF parameter, the minimum impedance value and the coil parameter of any short-circuited coil of the permanent magnet motor to be adjusted, to calculate the current value and the current density. The electronic equipment determines, according to the current value, the current density and the minimum impedance value, the generated heat value of the short-circuited coil in the unit time. The electronic equipment determines, according to the generated heat value and the information of the electromagnetic structure of the permanent magnet motor to be adjusted, the operational time of the short-circuited coil. The electronic equipment further judges, according to the operational time, whether the adjustment instruction is required to be transmitted to the production equipment. When the operational time is inconsistent with the preset time, the electronic equipment transmits the adjustment instruction to the production equipment. The production equipment adjusts, according to the adjustment instruction, the electromagnetic structure of the permanent magnet motor to be adjusted. In the disclosure, the electronic equipment calculates the current value, the current density, and the generated heat value of the short-circuited coil in the unit time, calculates the operational time of the short-circuited coil according to the generated heat value and the electromagnetic structure parameter of the permanent magnet motor, and further optimizes and adjusts the permanent magnet motor to be adjusted according to the operational time. As such, the short-circuited coil of the permanent magnet motor may operate for a longer time, the permanent magnet motor is optimized, and the safety of the permanent magnet motor is improved.

Based on the embodiments shown in FIGS. 1 to 3, when the permanent magnet motor is used, the method for adjusting a permanent magnet motor may also be configured to adjust a rotational speed of the permanent magnet motor, to ensure that the train may smoothly arrive the destination.

Figure 4:
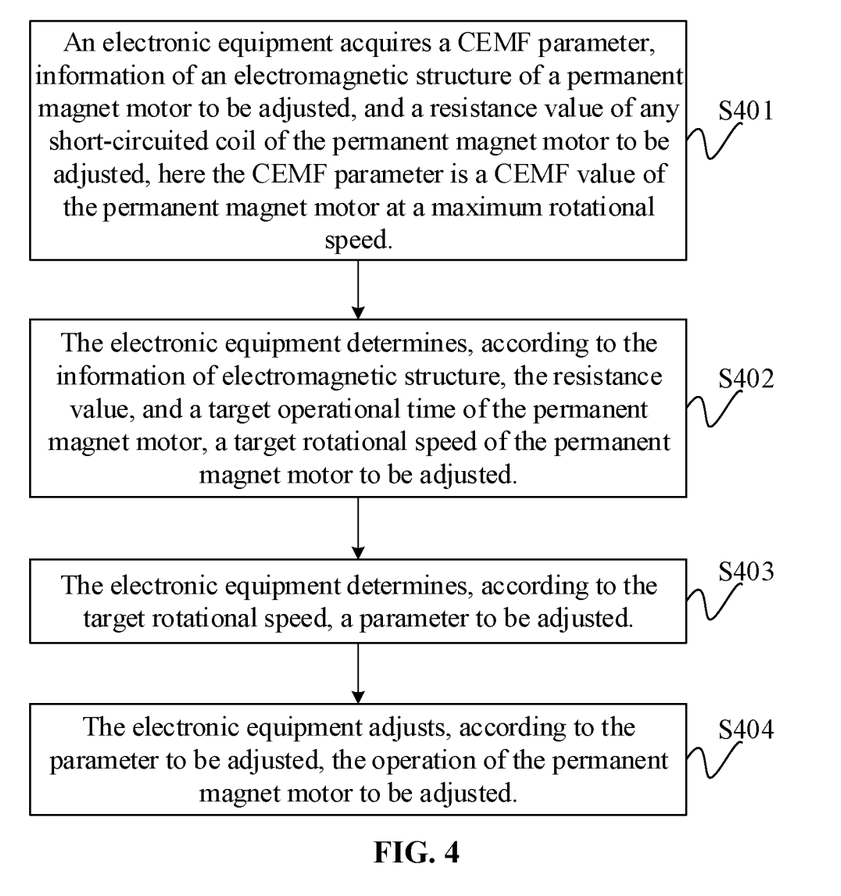
FIG. 4 is a flowchart of another method for adjusting a permanent magnet motor according to an embodiment of the disclosure.

FIG. 4 is a flowchart of another method for adjusting a permanent magnet motor according to an embodiment of the disclosure. As shown in FIG. 4, when a rail transit vehicle runs, the method of the embodiment may include the following operations.

In operation S401, an electronic equipment acquires a CEMF parameter, information of an electromagnetic structure of a permanent magnet motor to be adjusted and a minimum impedance value of any short-circuited coil of the permanent magnet motor to be adjusted, here the CEMF parameter is a CEMF value of the permanent magnet motor at a maximum rotational speed.

An implementation of the operation S401 is similar to that of the operation S101 in the embodiment shown in FIG. 1, and will not be elaborated in the embodiment.

In operation S402, the electronic equipment determines, according to the information of the electromagnetic structure, the minimum impedance value, and a target operational time of the permanent magnet motor, a target rotational speed of the permanent magnet motor to be adjusted.

In the embodiment, after an inter-turn short circuit occurs to a coil of the permanent magnet motor to be adjusted, the rail transit vehicle needs to keep operating for the target time to arrive the destination, to reduce the influence on the operating order as much as possible. After acquiring information such as the information of the electromagnetic structure, the minimum impedance value, and the target operational time of the permanent magnet motor, etc. according to the operation S401, the electronic equipment may calculate the target rotational speed of the permanent magnet motor to ensure that the permanent magnet motor may operate for the target time at the rotational speed.

In a specific embodiment, the rotational speed of the permanent magnet motor is calculated through the following operations.

In a first operation, the electronic equipment acquires a maximum temperature reachable for the permanent magnet motor to be adjusted, and determines, according to the temperature and a current temperature of the permanent magnet motor, a temperature variation of the permanent magnet motor.

In a second operation, the electronic equipment determines, according to the temperature variation and target operational time of the permanent magnet motor, a practical generated heat value of the short-circuited coil of the permanent magnet motor in a unit time.

In a third operation, the electronic equipment determines, according to the practical generated heat value and a heat dissipation value of a cooling electromagnetic structure of the permanent magnet motor in the unit time in the information of the electromagnetic structure, a generated heat value of the short-circuited coil in the unit time.

In a fourth operation, the electronic equipment determines, according to the generated heat value and the minimum impedance value, a CEMF value of the short-circuited coil.

In a fifth operation, the electronic equipment determines, according to a coil parameter, the CEMF value, and the information of the electromagnetic structure of the permanent magnet motor, the target rotational speed of the permanent magnet motor. Here the coil parameter includes turns of the coil, resistivity of the wire, etc., and the information of the electromagnetic structure of the permanent magnet motor includes a permanent magnet parameter, etc.

In operation S403, the electronic equipment determines, according to the target rotational speed, a parameter to be adjusted.

In the embodiment, the electronic equipment may calculate, according to the target rotational speed calculated in the operation S402, a running speed of the rail transit vehicle at the target rotational speed, and determine, according to the running speed, a parameter required to be adjusted.

In operation S404, the electronic equipment adjusts, according to the parameter to be adjusted, the operation of the permanent magnet motor to be adjusted.

In the embodiment, the rail transit vehicle includes multiple permanent magnet motors. When the inter-turn short circuit occurs to the permanent magnet motor to be adjusted, power of the permanent magnet motor to be adjusted is cut off. In order to ensure the safety of the permanent magnet motor to be adjusted when the rail transit vehicle runs, the electronic equipment adjusts other permanent magnet motors of the rail transit vehicle according to the parameter to be adjusted determined in the operation S403, to reduce the running speed of the rail transit vehicle to a safe running speed, to further ensure that the rotational speed of the permanent magnet motor to be adjusted is less than or equal to the target rotational speed.

According to the method for adjusting a permanent magnet motor provided in the embodiment, the electronic equipment determines, according to the information of the electromagnetic structure, the minimum impedance value, and a preset operational time of the permanent magnet motor, the target rotational speed of the permanent magnet motor to be adjusted, and further determines the parameter to be adjusted of the rail transit vehicle according to the target rotational speed, to make an adjusted rotational speed of the permanent magnet motor of the rail transit vehicle less than or equal to the target rotational speed. In the disclosure, for the rail transit vehicle in operation, when the inter-turn short circuit occurs to the permanent magnet motor of the rail transit vehicle, the electronic equipment adjusts the running speed of the rail transit vehicle to make the operational time of the permanent magnet motor where the inter-turn short circuit occurs equal to the target operational time, to ensure that the rail transit vehicle may keep running to the destination safely after the inter-turn short circuit failure occurs to the permanent magnet motor, to further ensure the safety of a person or goods in the rail transit vehicle, and improve the safety of the rail transit vehicle.

Figure 5:
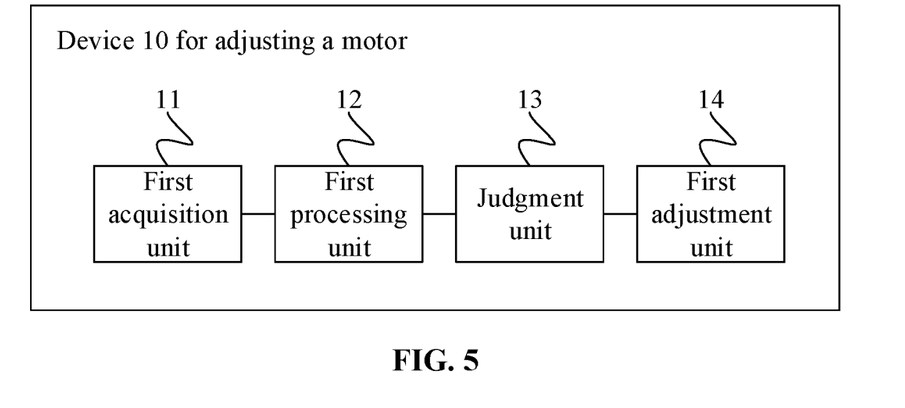
FIG. 5 is a schematic structural diagram of a device for adjusting a permanent magnet motor according to an embodiment of the disclosure.

FIG. 5 is a schematic diagram of electromagnetic structure of a device for adjusting a permanent magnet motor according to an embodiment of the disclosure. As shown in FIG. 5, the device for adjusting a permanent magnet motor 10 of the embodiment is configured to implement the operations corresponding to the electronic equipment in any of the above-mentioned method embodiments. The device for adjusting a permanent magnet motor 10 of the embodiment may include a first acquisition unit 11, a first processing unit 12, a judgment unit 13, and a first adjustment unit 14.

The first acquisition unit 11 is configured to acquire a CEMF parameter, information of an electromagnetic structure of a permanent magnet motor to be adjusted and a minimum impedance value of any short-circuited coil of the permanent magnet motor to be adjusted, here the CEMF parameter is a CEMF value of the permanent magnet motor at a maximum rotational speed.

The first processing unit 12 is configured to determine, according to the CEMF parameter, the information of the electromagnetic structure and the minimum impedance value, an operational time of the short-circuited coil.

The judgment unit 13 is configured to judge whether the operational time is consistent with a preset time.

The first adjustment unit 14 is configured to transmit, to a production equipment, an adjustment instruction configured to instruct the production equipment to adjust the electromagnetic structure of the permanent magnet motor to be adjusted, when the operational time is inconsistent with the preset time, so that the production equipment adjusts the electromagnetic structure of the permanent magnet motor to be adjusted.

The device for adjusting a permanent magnet motor 10 provided in the embodiment of the disclosure may execute the above-mentioned method embodiments, and a specific implementation principle and technical effect thereof may refer to the above-mentioned method embodiments, and will not be elaborated in the embodiment.

Figure 6:
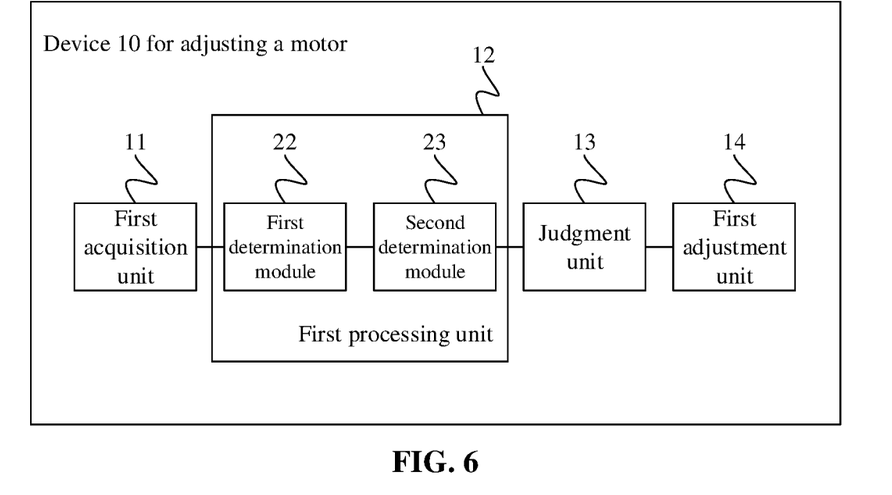
FIG. 6 is a schematic structural diagram of another device for adjusting a permanent magnet motor according to an embodiment of the disclosure.

FIG. 6 is a schematic diagram of electromagnetic structure of another device for adjusting a permanent magnet motor according to an embodiment of the disclosure. Based on the embodiment shown in FIG. 5, as shown in FIG. 6, the device for adjusting a permanent magnet motor 10 of the embodiment is configured to implement the operations corresponding to the electronic equipment in any of the above-mentioned method embodiments. In the device for adjusting a permanent magnet motor 10 of the embodiment, the first acquisition unit 11, when configured to acquire the CEMF parameter, is specifically configured to: transmit an acquisition instruction to a permanent magnet motor, and receive the CEMF parameter returned by the permanent magnet motor according to the acquisition instruction; or, determine, through a simulation technology, the CEMF value of the permanent magnet motor at the maximum rotational speed.

The first processing unit 12 includes a first determination module 22 and a second determination module 23.

The first determination module 22 is configured to determine, according to the CEMF parameter and the minimum impedance value, a generated heat value of the short-circuited coil.

The second determination module 23 is configured to determine, according to the generated heat value of the short-circuited coil and the information of the electromagnetic structure, the operational time of the short-circuited coil.

The device for adjusting a permanent magnet motor 10 provided in the embodiment of the disclosure may execute the above-mentioned method embodiments, and a specific implementation principle and technical effect thereof may refer to the above-mentioned method embodiments, and will not be elaborated in the embodiment.

Figure 7:
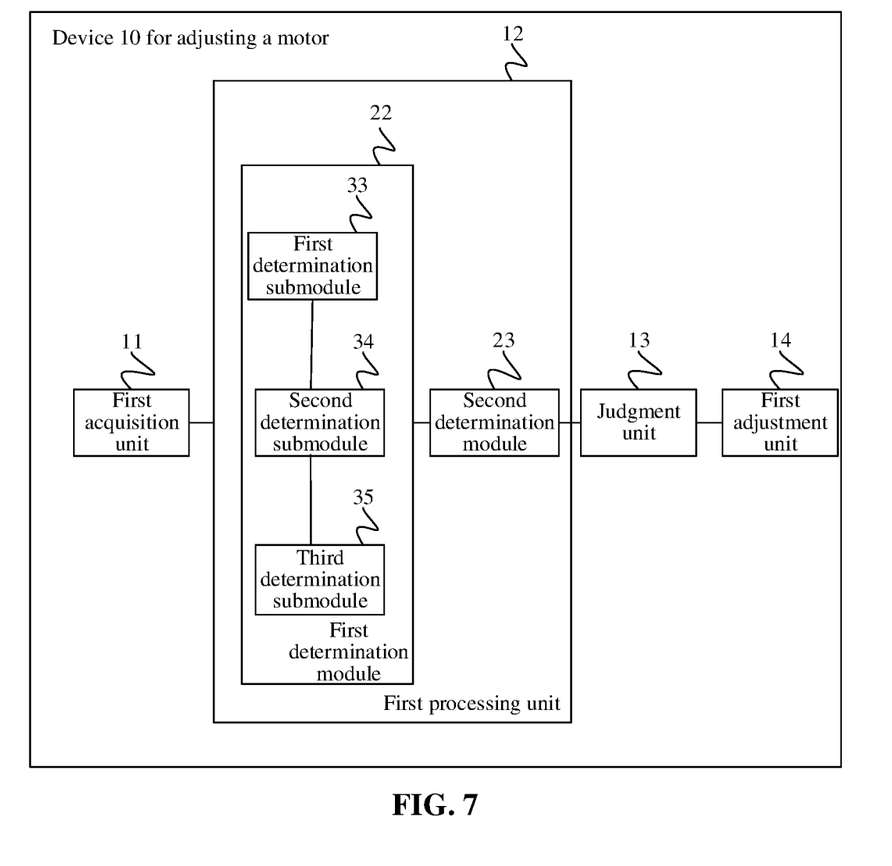
FIG. 7 is a schematic structural diagram of another device for adjusting a permanent magnet motor according to an embodiment of the disclosure.

FIG. 7 is a schematic diagram of electromagnetic structure of another device for adjusting a permanent magnet motor according to an embodiment of the disclosure. Based on the embodiments shown in FIGS. 5 and 6, as shown in FIG. 7, the device for adjusting a permanent magnet motor 10 of the embodiment is configured to implement the operations corresponding to the electronic equipment in any of the above-mentioned method embodiments. The device for adjusting a permanent magnet motor 10 of the embodiment may further include a second acquisition unit 15.

The second acquisition unit 15 is configured to acquire a coil parameter of a coil of the permanent magnet motor to be adjusted.

The first determination module 22 includes a first determination submodule 33, a second determination submodule 34, and a third determination submodule 35.

The first determination submodule 33 is configured to determine, according to the CEMF parameter and the minimum impedance value, a current value of the short-circuited coil.

The second determination submodule 34 is configured to determine, according to the coil parameter and the current value, a current density of the short-circuited coil.

The third determination submodule 35 is configured to determine, according to the current density and the minimum impedance value, the generated heat value of the short-circuited coil.

In an example, the information of the electromagnetic structure of the permanent magnet motor to be adjusted includes one or more of: information of cooling electromagnetic structure of the permanent magnet motor, a melting point of an insulating material, a permanent magnet parameter, a slot shape parameter of the permanent magnet motor, an electromagnetic wire parameter, etc.

In an example, the adjustment instruction is specifically configured to instruct the production equipment to perform one or more of: adjusting the permanent magnet parameter, replacing the insulating material, adjusting a cooling electromagnetic structure of the permanent magnet motor, adjusting the slot shape parameter of the permanent magnet motor, adjusting the electromagnetic wire parameter, etc., on the permanent magnet motor to be adjusted.

The device for adjusting a permanent magnet motor 10 provided in the embodiment of the disclosure may execute the above-mentioned method embodiments, and a specific implementation principle and technical effect thereof may refer to the above-mentioned method embodiments, and will not be elaborated in the embodiment.

Figure 8:
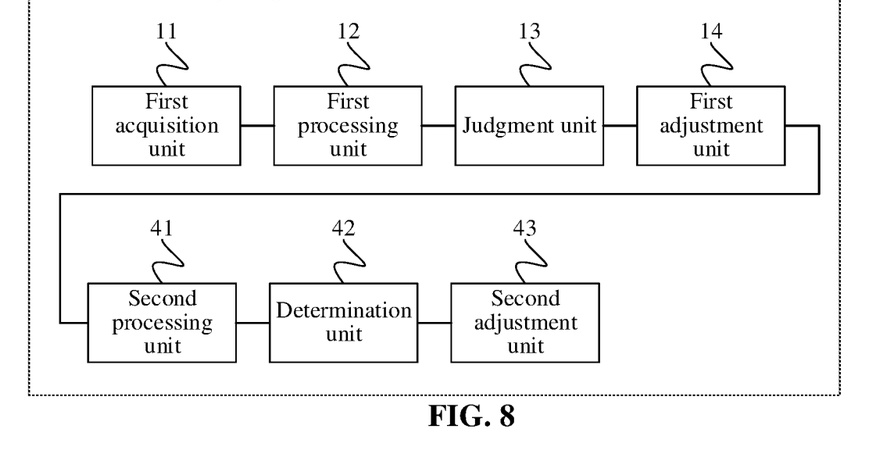
FIG. 8 is a schematic structural diagram of another device for adjusting a permanent magnet motor according to an embodiment of the disclosure.

FIG. 8 is a schematic diagram of electromagnetic structure of another device for adjusting a permanent magnet motor according to an embodiment of the disclosure. Based on the embodiment shown in FIG. 5, as shown in FIG. 8, when the rail transit vehicle runs, the device for adjusting a permanent magnet motor 10 of the embodiment is configured to implement the operations corresponding to the electronic equipment in any of the above-mentioned method embodiments. The device for adjusting a permanent magnet motor 10 of the embodiment may further include a second processing unit 41, a determination unit 42, and a second adjustment unit 43.

The second processing unit 41 is configured to determine, according to the information of the electromagnetic structure, the minimum impedance value, and a target operational time of the permanent magnet motor, a target rotational speed of the permanent magnet motor to be adjusted.

The determination unit 42 is configured to determine, according to the target rotational speed, a parameter to be adjusted.

The second adjustment unit 43 is configured to adjust, according to the parameter to be adjusted, the operation of the permanent magnet motor to be adjusted.

The device for adjusting a permanent magnet motor 10 provided in the embodiment of the disclosure may execute the above-mentioned method embodiments, and a specific implementation principle and technical effect thereof may refer to the above-mentioned method embodiments, and will not be elaborated in the embodiment.

In the disclosure, functional units of the device for adjusting a permanent magnet motor may be divided according to the above-mentioned method examples. For example, each functional unit may be divided by way of corresponding to each function, or two or more functions may be integrated into a processing unit. The integrated unit may be implemented in a hardware form, or may be implemented in form of a software functional unit. It is to be noted that the division of units in each embodiment of the disclosure is schematic and is only a logical function division, and other division manners may be adopted during practical implementation.

Figure 9:
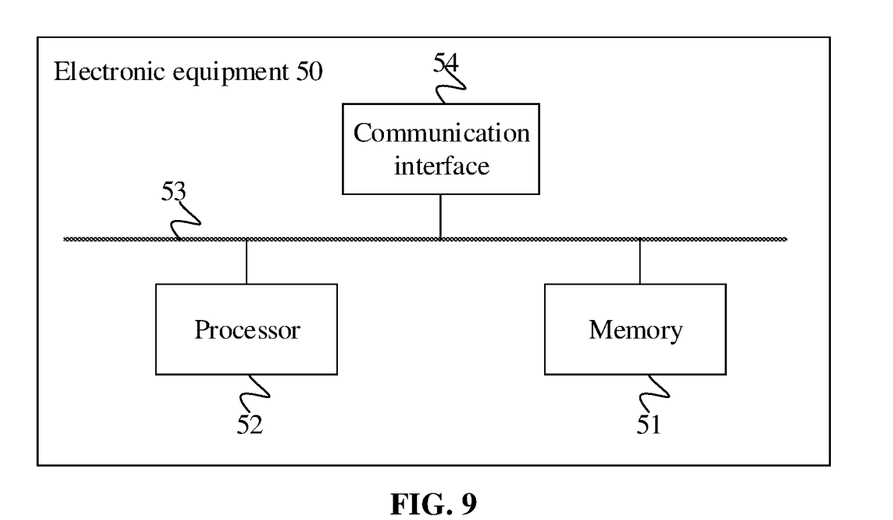
FIG. 9 is a schematic structural diagram of hardware of an electronic equipment according to an embodiment of the disclosure.

FIG. 9 is a schematic diagram of hardware electromagnetic structure of an electronic equipment according to an embodiment of the disclosure. As shown in FIG. 9, the electronic equipment 50 is configured to implement the operations corresponding to the electronic equipment in any of the above-mentioned method embodiments. The electronic equipment 50 of the embodiment may include a memory 51, a processor 52, and a communication interface 54.

The memory 51 is configured to store a computer program.

The processor 52 is configured to execute the computer program stored in the memory to implement the method for adjusting a permanent magnet motor in the above-mentioned embodiments. References may specifically be made to the related descriptions in the above-mentioned method embodiments.

In an embodiment, the memory 51 may be independent, or may be integrated with the processor 52.

When the memory 51 is a device independent of the processor 52, the electronic equipment 50 may further include a bus 53.

The bus 53 is configured to connect the memory 51 with the processor 52.

In an embodiment, the embodiment further includes the communication interface 54 which may be connected with the processor 51 through the bus 53. The processor 52 may control the communication interface 54 to realize receiving and transmitting functions of the electronic equipment 50.

The electronic equipment provided in the embodiment may be configured to execute the method for adjusting a permanent magnet motor, and an implementation and technical effect thereof are similar, and will not be elaborated in the embodiment.

The disclosure also provides a computer-readable storage medium including a computer program which is configured to implement the method for adjusting a permanent magnet motor in the above-mentioned embodiments.

In some embodiments provided by the disclosure, it is to be understood that the disclosed device and method may be implemented in other manners. For example, the device embodiment as described above is only schematic, and for example, the division of modules is only a logical function division, and other division manners may be adopted during practical implementation. For example, multiple modules may be combined or integrated into another system, or some characteristics may be neglected or may not be executed. In addition, coupling or direct coupling or communication connection between each displayed or discussed component may be indirect coupling or communication connection implemented through some interfaces, devices or modules, and may be electrical and mechanical or adopt other forms.

The modules described as separate parts may be or may not be physically separated, and parts displayed as modules may be or may not be physical units, namely, they may be located in the same place, or may be distributed to multiple network units. Part or all of the modules may be selected to achieve the purposes of the solutions of the embodiments as required.

In addition, each function module in each embodiment of the disclosure may be integrated into a processing module, or each module may physically exist independently, or two or more modules may be integrated into a module. The integrated module may be implemented in a hardware form, or may be implemented in form of hardware and software function unit.

The integrated module implemented in form of a software function module may be stored in a computer-readable storage medium. The software function module is stored in a storage medium, including multiple instructions configured to enable a computer device (which may be a personal computer, a server, a network device, etc.) or a processor to execute part of the steps of the method in each embodiment of the disclosure.

It is to be understood that the processor may be a Central Processing Unit (CPU), or another general-purpose processor, a Digital Signal Processor (DSP), an Application Specific Integrated Circuit (ASIC), etc. The general-purpose processor may be a microprocessor, or the processor may be any conventional processor, etc. The steps of the method disclosed in combination with the disclosure may be directly embodied to be executed and completed by a hardware processor, or executed and completed by a combination of hardware and software modules in the processor.

The memory may include a high-speed Random Access Memory (RAM), or may include a Non-Volatile Memory (NVM), such as at least one disk memory, or may be a U disk, a mobile hard disk, a Read-Only Memory (ROM), a magnetic disk, an optical disk, etc.

The bus may be an Industry Standard Architecture (ISA) bus, a Peripheral Component Interconnect (PCI) bus, an Extended Industry Standard Architecture (EISA) bus, etc. The bus may be divided into an address bus, a data bus, a control bus, etc. For ease of representation, the bus in the drawings of the disclosure is not limited to one bus or one type of bus.

The computer-readable storage medium may be implemented by any type of volatile or nonvolatile storage devices or a combination thereof, such as a Static Random-Access Memory (SRAM), an Electrically-Erasable Programmable Read-Only Memory (EEPROM), an Erasable Programmable Read-Only Memory (EPROM), a Programmable Read-Only Memory (PROM), a ROM, a magnetic memory, a flash memory, a magnetic disk, or an optical disk. The storage medium may be any available medium accessible for a general-purpose or special-purpose computer.

It may be understood by those of ordinary skill in the art that all or part of the steps of the above-mentioned method embodiments may be completed by instructing related hardware through a program. The program may be stored in a computer-readable storage medium. The program is executed to execute the steps in the above-mentioned method embodiments. The storage medium includes various media capable of storing program codes such as a ROM, a RAM, a magnetic disk, or an optical disk, etc.

Finally, it is to be noted that the above-mentioned embodiments are not used to limit but used only to describe the technical solutions of the disclosure. Although the disclosure is described in detail with reference to the above-mentioned embodiments, it is to be understood by those of ordinary skill in the art that the technical solutions recorded in the above-mentioned embodiments may also be modified, or part or all of technical features therein may be equivalently replaced. The essences of corresponding technical solutions obtained by these modifications or replacements do not depart from the scopes of the technical solutions of the embodiments of the disclosure.

The invention claimed is:

1. A method for adjusting a permanent magnet motor, applied to a controller, the method comprising:

acquiring a counter electromotive force (CEMF) parameter, information of an electromagnetic structure of the permanent magnet motor to be adjusted and a resistance value of any short-circuited coil of the permanent magnet motor, the CEMF parameter being a CEMF value of the permanent magnet motor at an upper limited rotational speed;

determining, according to the CEMF parameter, the information of the electromagnetic structure and the resistance value, an operational time of the short-circuited coil; and transmitting, to a production equipment, an adjustment instruction configured to instruct the production equipment to adjust the electromagnetic structure of the permanent magnet motor, when the operational time of the short-circuited coil is inconsistent with a preset time, so that the production equipment adjusts the electromagnetic structure of the permanent magnet motor, wherein the determining, according to the CEMF parameter, the information of the electromagnetic structure and the resistance value, the operational time of the short-circuited coil comprises:

determining a generated heat value of the short-circuited coil by:

$Q=I^2Rt,$ wherein Q is the generated heat value in Joules, V is the CEMF value in volts, R is the resistance value in Ohms, and t is a unit time;

acquiring a heat dissipation value generated by a cooling electromagnetic structure of the permanent magnet motor in the unit time according to information of the cooling electromagnetic structure;

calculating a practical generated heat value of the permanent magnet motor according to the generated heat value and the heat dissipation value, wherein a temperature of the permanent magnet motor rises continuously with an accumulation of the practical generated heat value;

acquiring a threshold temperature value that causes an insulating material to melt and the short-circuited coil to be fused; and determining, according to the temperature of the permanent magnet motor and the threshold temperature value, the operational time of the short-circuited coil, wherein the operational time of the short-circuited coil is an operational time of the permanent magnet motor before reaching the threshold temperature value.

2. The method of claim 1, wherein the acquiring the CEMF comprises:
transmitting an acquisition instruction to a test permanent magnet motor, and receiving the CEMF parameter returned by the test permanent magnet motor according to the acquisition instruction; or,
determining, through a simulation technology, the CEMF value of the permanent magnet motor at the upper limited rotational speed.

3. The method of claim 1, further comprising:
acquiring a coil parameter of a coil of the permanent magnet motor,
wherein the determining, according to the CEMF parameter and the resistance value, the generated heat value of the short-circuited coil comprises:
determining, according to the CEMF parameter and the resistance value, a current value of the short-circuited coil;
determining, according to the coil parameter and the current value, a current density of the short-circuited coil; and
determining, according to the current density and the resistance value, the generated heat value of the short-circuited coil.

4. The method of claim 1, wherein the information of the electromagnetic structure of the permanent magnet motor comprises one or more of: information of a cooling structure of the permanent magnet motor, a melting point of the insulating material, a permanent magnet parameter, a slot shape parameter of the permanent magnet motor, or an electromagnetic wire parameter.

5. The method of claim 1, wherein the adjustment instruction is specifically configured to instruct the production equipment to perform one or more of: adjusting a permanent magnet parameter, replacing the insulating material, adjusting a cooling structure of the permanent magnet motor, adjusting a slot shape parameter, or adjusting an electromagnetic wire parameter, on the permanent magnet motor.

6. The method of claim 1, further comprising:
determining, according to the information of the electromagnetic structure, the resistance value, and a target operational time of the permanent magnet motor, a target rotational speed of the permanent magnet motor;
determining, according to the target rotational speed, a parameter to be adjusted; and
adjusting, according to the parameter to be adjusted, an operational speed of the permanent magnet motor.

7. A device for adjusting a permanent magnet motor, comprising a memory, a processor, and a communication interface,
wherein the memory is configured to store an executable instruction for the processor;
the communication interface is configured to acquire or transmit information according to an instruction of the processor; and
the processor is configured to:
acquire a counter electromotive force (CEMF) parameter, information of an electromagnetic structure of the permanent magnet motor to be adjusted and a resistance value of any short-circuited coil of the permanent magnet motor, the CEMF parameter being a CEMF value of the permanent magnet motor at an upper limited rotational speed;
determine, according to the CEMF parameter, the information of the electromagnetic structure and the resistance value, an operational time of the short-circuited coil;
judge whether the operational time of the short-circuited coil is consistent with a preset time; and
transmit, to a production equipment, an adjustment instruction configured to instruct the production equipment to adjust the electromagnetic structure of the permanent magnet motor, when the operational time of the short-circuited coil is inconsistent with the preset time, so that the production equipment adjusts the electromagnetic structure of the permanent magnet motor,
wherein in order to determine, according to the CEMF parameter, the information of the electromagnetic structure and the resistance value, the operational time of the short-circuited coil, the processor is configured to:
determine a generated heat value of the short-circuited coil by:

$Q=I^2Rt,$ wherein Q is the generated heat value in Joules, V is the CEMF value in volts, R is the resistance value in Ohms, and t is a unit time;
acquire a heat dissipation value generated by a cooling electromagnetic structure of the permanent magnet motor in the unit time according to information of the cooling electromagnetic structure;
calculate a practical generated heat value of the permanent magnet motor according to the generated heat value and the heat dissipation value, wherein a temperature of the permanent magnet motor rises continuously with an accumulation of the practical generated heat value;
acquire a threshold temperature value that causes an insulating material to melt and the short-circuited coil to be fused; and
determine, according to the temperature of the permanent magnet motor and the threshold temperature value, the operational time of the short-circuited coil, wherein the operational time of the short-circuited coil is an operational time of the permanent magnet motor before reaching the threshold temperature value.

8. The device of claim 7, wherein in order to acquire the CEMF parameter, the processor is configured to:
transmit an acquisition instruction to a test permanent magnet motor, and receive the CEMF parameter returned by the test permanent magnet motor according to the acquisition instruction; or,
determine, through a simulation technology, the CEMF value of the permanent magnet motor at the upper limited rotational speed.

9. The device of claim 7, wherein the processor is further configured to:
acquire a coil parameter of a coil of the permanent magnet motor,
wherein in order to determine, according to the CEMF parameter and the resistance value, the generated heat value of the short-circuited coil, the processor is further configured to:
determine, according to the CEMF parameter and the resistance value, a current value of the short-circuited coil;

determine, according to the coil parameter and the current value, a current density of the short-circuited coil; and determine, according to the current density and the resistance value, the generated heat value of the short-circuited coil.

10. The device of claim 7, wherein the information of the electromagnetic structure of the permanent magnet motor comprises one or more of: information of a cooling structure of the permanent magnet motor, a melting point of the insulating material, a permanent magnet parameter, a slot shape parameter of the permanent magnet motor, or an electromagnetic wire parameter.

11. The device of claim 7, wherein the adjustment instruction is specifically configured to instruct the production equipment to perform one or more of: adjusting a permanent magnet parameter, replacing the insulating material, adjusting a cooling structure of the permanent magnet motor, adjusting a slot shape parameter, or adjusting an electromagnetic wire parameter, on the permanent magnet motor.

12. The device of claim 7, wherein the processor is further configured to:

determine, according to the information of the electromagnetic structure, the resistance value, and a target operational time of the permanent magnet motor, a target rotational speed of the permanent magnet motor;

determine, according to the target rotational speed, a parameter to be adjusted; and adjust, according to the parameter to be adjusted, an operational speed of the permanent magnet motor.

13. A non-transitory computer-readable storage medium having stored therein a computer-executable instruction which, when executed by a processor, cause the processor to perform steps of:

acquiring a counter electromotive force (CEMF) parameter, information of an electromagnetic structure of a permanent magnet motor to be adjusted and a resistance value of any short-circuited coil of the permanent magnet motor, the CEMF parameter being a CEMF value of the permanent magnet motor at an upper limited rotational speed;

determining, according to the CEMF parameter, the information of the electromagnetic structure and the resistance value, an operational time of the short-circuited coil; and transmitting, to a production equipment, an adjustment instruction configured to instruct the production equipment to adjust the electromagnetic structure of the permanent magnet motor, when the operational time of the short-circuited coil is inconsistent with a preset time, so that the production equipment adjusts the electromagnetic structure of the permanent magnet motor, wherein the determining, according to the CEMF parameter, the information of the electromagnetic structure and the resistance value, the operational time of the short-circuited coil comprises:

determining a generated heat value of the short-circuited coil by:

$$Q = I^2 R t,$$

wherein Q is the generated heat value in Joules, V is the CEMF value in volts, R is the resistance value in Ohms, and t is a unit time;

acquiring a heat dissipation value generated by a cooling electromagnetic structure of the permanent magnet motor in the unit time according to information of the cooling electromagnetic structure;

calculating a practical generated heat value of the permanent magnet motor according to the generated heat value and the heat dissipation value, wherein a temperature of the permanent magnet motor rises continuously with an accumulation of the practical generated heat value;

acquiring a threshold temperature value that causes an insulating material to melt and the short-circuited coil to be fused; and determining, according to the temperature of the permanent magnet motor and the threshold temperature value, the operational time of the short-circuited coil, wherein the operational time of the short-circuited coil is an operational time of the permanent magnet motor before reaching the threshold temperature value.

14. The non-transitory computer-readable storage medium of claim 13, wherein the acquiring the CEMF comprises:

transmitting an acquisition instruction to a test permanent magnet motor, and receiving the CEMF parameter returned by the test permanent magnet motor according to the acquisition instruction; or, determining, through a simulation technology, the CEMF value of the permanent magnet motor at the upper limited rotational speed.

15. The non-transitory computer-readable storage medium of claim 13, further comprising: acquiring a coil parameter of a coil of the permanent magnet motor to be adjusted, wherein the determining, according to the CEMF parameter and the resistance value, the generated heat value of the short-circuited coil comprises:

determining, according to the CEMF parameter and the resistance value, a current value of the short-circuited coil;

determining, according to the coil parameter and the current value, a current density of the short-circuited coil; and determining, according to the current density and the resistance value, the generated heat value of the short-circuited coil.

16. The non-transitory computer-readable storage medium of claim 13, wherein the information of the electromagnetic structure of the permanent magnet motor comprises one or more of: information of a cooling structure of the permanent magnet motor, a melting point of the insulating material, a permanent magnet parameter, a slot shape parameter of the permanent magnet motor, or an electromagnetic wire parameter.

17. The non-transitory computer-readable storage medium of claim 13, wherein the adjustment instruction is specifically configured to instruct the production equipment to perform one or more of: adjusting a permanent magnet parameter, replacing the insulating material, adjusting a cooling structure of the permanent magnet motor, adjusting a slot shape parameter, or adjusting an electromagnetic wire parameter, on the permanent magnet motor.

* * * * *